United States Patent
Krause et al.

(10) Patent No.: US 9,352,936 B2
(45) Date of Patent: May 31, 2016

(54) METHOD AND APPARATUS FOR DETERMINING A FORCE, AND USE OF THE METHOD AND/OR OF THE APPARATUS

(75) Inventors: Uwe Krause, Pattensen (DE); Uwe Nolte, Barsinghausen (DE); Guido Sonntag, Gehrden (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 507 days.

(21) Appl. No.: 13/976,699

(22) PCT Filed: Dec. 15, 2011

(86) PCT No.: PCT/EP2011/072888
§ 371 (c)(1),
(2), (4) Date: Jun. 27, 2013

(87) PCT Pub. No.: WO2012/089522
PCT Pub. Date: Jul. 5, 2012

(65) Prior Publication Data
US 2013/0270046 A1    Oct. 17, 2013

(30) Foreign Application Priority Data
Dec. 27, 2010 (DE) .......... 10 2010 064 217

(51) Int. Cl.
| | | |
|---|---|---|
| G05B 5/00 | (2006.01) | |
| B66B 13/26 | (2006.01) | |
| B66B 13/08 | (2006.01) | |
| B66B 13/14 | (2006.01) | |

(52) U.S. Cl.
CPC ............. *B66B 13/26* (2013.01); *B66B 13/08* (2013.01); *B66B 13/143* (2013.01); *Y02B 50/12* (2013.01)

(58) Field of Classification Search
CPC .................................... H02P 29/0033
USPC ........................... 318/474, 445, 34
See application file for complete search history.

(56) References Cited

U.S. PATENT DOCUMENTS

| | | | |
|---|---|---|---|
| 2,572,196 A | | 10/1951 | Raque |
| 4,543,638 A | * | 9/1985 | Scarffe .......... 700/245 |

(Continued)

FOREIGN PATENT DOCUMENTS

| | | |
|---|---|---|
| CN | 1054050 | 8/1991 |
| CN | 1244492 | 2/2000 |

(Continued)

OTHER PUBLICATIONS

Chinese Office Action for related Chinese Patent Application No. 201180062888.6, mailed Mar. 5, 2014, 14 pages.

(Continued)

*Primary Examiner* — David S Luo
(74) *Attorney, Agent, or Firm* — Henry M. Feiereisen LLC.

(57) ABSTRACT

A method determines a force which acts via a drive wheel, which is fastened on a motor shaft of an electric motor or on an output shaft of a geared motor, on a component, which is coupled to the drive wheel directly in form-fitting and/or force-fitting manner. The electric motor is coupled electrically to a power amplifier, which is coupled to a power-supply unit via a connecting circuit. The force is determined using a voltage and a current which are determined in the connecting circuit. An apparatus implements the method.

13 Claims, 1 Drawing Sheet

(56) References Cited

U.S. PATENT DOCUMENTS

| | | |
|---|---|---|
| 5,131,506 A | 7/1992 | Mizuno et al. |
| 5,267,478 A | 12/1993 | Stridsberg |
| 5,483,135 A | 1/1996 | Parks |
| 5,668,451 A | 9/1997 | Driendl et al. |
| 2007/0075669 A1 | 4/2007 | Gregori |
| 2010/0126073 A1 | 5/2010 | Schroeder et al. |

FOREIGN PATENT DOCUMENTS

| | | |
|---|---|---|
| DE | 3303590 A1 | 8/1984 |
| DE | 19514954 A1 | 12/1995 |
| DE | 10307683 | 9/2004 |
| DE | 102006046384 A1 | 4/2007 |
| DE | 102010064217.7 | 12/2010 |
| EP | 0714052 A2 | 5/1996 |
| EP | 0848309 A1 | 6/1998 |
| EP | 0923012 | 6/1999 |
| EP | 0976675 | 2/2000 |
| JP | 09290986 | 11/1997 |
| JP | 2000-128465 | 5/2000 |
| WO | 93/16948 | 9/1993 |
| WO | 2004/021094 | 3/2004 |
| WO | PCT/EP2011/072888 | 12/2011 |

OTHER PUBLICATIONS

International Search Report for PCT/EP2011/072888, mailed on Mar. 28, 2012, 3 pages.

European Office Action dated Dec. 17, 2015 in corresponding European Patent Application No. 2630072 B1.

Horst Kuchling; "Taschenbuch der Physik", Verlag Harri Deutsch, Thun und Frankfurt/Main, 4. Auflage, 1982, 5 pp.

* cited by examiner

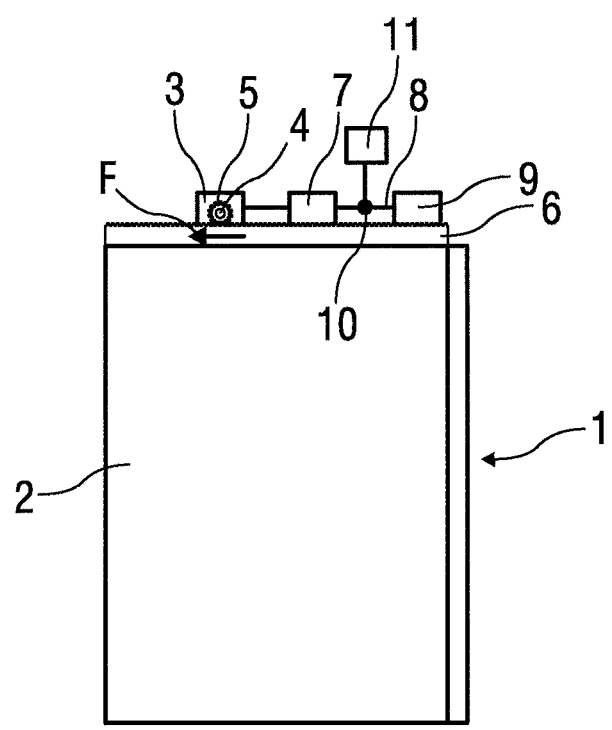

METHOD AND APPARATUS FOR DETERMINING A FORCE, AND USE OF THE METHOD AND/OR OF THE APPARATUS

CROSS REFERENCE TO RELATED APPLICATIONS

This application is based on and hereby claims priority to International Application No. PCT/EP2011/072888 filed on Dec. 15, 2011 and German Application No. 10 2010 064 217.7 filed on Dec. 27, 2010, the contents of which are hereby incorporated by reference.

BACKGROUND

The invention relates to a method for determining a force, and an apparatus to determine the force.

It is known from the related art to couple a car door of an elevator with a pinion gear of a motor shaft of an electric motor so that the car door can be opened and closed by the electric motor. The electric motor is electrically coupled to a power amplifier which is coupled by way of a connecting electrical circuit to an electricity supply unit in the form of a power supply.

Various methods for determining the force of the electric motor acting on the car door are known, for example measuring the motor current and determining the force by the motor constant and the laws of mechanical force transmission. Furthermore, force measuring devices are also possible. Moreover, it is also possible, if the door mass is known, to calculate the force by determining the door's acceleration.

To limit the maximum possible force acting on the elevator car door, in order for example to prevent injury to persons in the event of their becoming trapped, use is made of mechanical devices, a slipping clutch for example, which allow only transmission of a predefined maximum force.

JP 2000128465 A discloses a controller for a door of an elevator, wherein a drive force acting on the door is determined.

It is furthermore possible to limit the force by limiting the motor voltage with a compensation of the counter-electromotive force.

SUMMARY

One potential object is to disclose an improved method for determining a force, an apparatus for performing the method, and a use of the method and/or apparatus.

The inventors propose a method for determining a force which acts by way of a pinion gear which is mounted to a motor shaft of an electric motor on a component which is directly coupled to the pinion gear in a form-fit and/or force-fit manner. The electric motor is electrically coupled to a power amplifier which is coupled by way of a connecting electrical circuit to an electricity supply unit. The force is determined by a voltage and a current which are determined in the connecting electrical circuit. In a geared motor the pinion gear is alternatively mounted to an output shaft.

The component is for example a door of an elevator car and has for example a gear rack by way of which the car door is directly coupled to the pinion gear, embodied for example as a gearwheel, of the electric motor in a form-fit manner. Alternatively the pinion gear can be embodied for example as a friction gear and be coupled directly to the component, embodied for example as a car door, in a force-fit manner.

In another possible alternative the car door can also be coupled to the pinion gear of the electric motor for example via a toothed drive belt, in which case the toothed drive belt is then already the component onto which the force that is to be determined is transmitted by the pinion gear of the electric motor. However, given a transmission ratio of 1:1 in the coupling between the pinion gear and the car door, i.e. between the pinion gear and possible further gears present in the coupling, if friction losses are ignored the force acting on the car door is identical to the force transmitted onto the toothed drive belt by the pinion gear.

The force applied in order to move car doors of said type must not exceed a predefined maximum so that if, for example, persons or objects become trapped, any injury to the persons or damage to the objects is avoided. If a malfunction is detected, i.e. the car door does not open or close fully due to its being blocked for example by persons or objects that have become trapped, the electric motor should be switched off. The electric motor must also be switched off if an excessively high force is determined, since this could lead to injuries to persons or damage to objects upon their coming into contact with the car door.

By the method it is possible to determine in a simple and cost-effective manner the force that is transmitted onto the car door by the electric motor with the car door stationary, for example when the car door is blocked, or when the car door is moving, and therefore acting for example on persons or objects if a front edge of the car door should strike said persons or objects and/or if the persons or objects are trapped by the car door.

In the process the voltage and the current are measured in the connecting electrical circuit by way of which the electricity supply unit, for example a power supply, is coupled to the power amplifier, in particular to an output stage, also called a motor end stage, i.e. in an intermediate electrical circuit. Consequently no intervention in the power amplifier or the electric motor or in the electrical coupling between the power amplifier and the electric motor is necessary in order to determine the voltage and current. Furthermore, the voltage and the current can be determined in a cost-effective manner by corresponding sensors, since measurements can be taken on a potential-related basis. This enables a plurality of different power amplifiers and electric motors to be used, and the method can be performed without problem in each case.

When the force is determined, friction losses and an efficiency rating of the electric motor are ignored. For this reason a real force is always less than the determined force, because there is always a minimum of friction present. This always provides a safety margin, thus preventing the predefined permissible maximum force from being exceeded.

The voltage and current in the connecting electrical circuit are beneficially determined as average values over a predefined time interval. Such a time interval is for example ten milliseconds. This is useful on account of energy being stored in the arrangement formed by the electricity supply unit, the power amplifier, the electric motor and the component coupled thereto. This enables transient force peaks that are not detectable during the energy input to be caused or compensated. Determining the voltage and current as average values over the predefined time interval helps avoid false alarms due to incorrectly determined forces, for example due to a transient force peak, and for example an erroneous shutdown of the electric motor resulting therefrom.

In the case of an elevator, false alarms of said type would potentially result in a long downtime of the elevator and a high maintenance overhead with correspondingly high maintenance costs. The predefined time interval should be specified as sufficiently short according to the respective application. In the case of the car door the time interval should be specified for example as short enough to ensure that anyone trapped by the door will not be injured and trapped objects will not be damaged. This is assured with a predefined time interval of for example ten milliseconds, because the effect of such a short-lived force would be barely perceptible.

In an immobile state of the component the force is preferably determined by the voltage determined in the connecting electrical circuit, by the current determined in the connecting electrical circuit, by a motor constant, by a resistance of the electric motor, also called winding resistance or internal resistance, and by a radius of the pinion gear. In this way it is possible in the immobile state of the component, i.e. for example with the car door stationary, to determine the force that is transmitted by the pinion gear onto the component and acts by way of the car door on persons or objects possibly trapped thereby.

In addition to the determined current and voltage, only the motor constant and the resistance of the respective electric motor as well as the radius of the pinion gear used in each case must be known in order to perform the method. The motor constant and the resistance of the electric motor can be taken for example from a datasheet of the electric motor, while the radius of the pinion gear can likewise be found for example in a corresponding datasheet or can be measured.

The force can be determined according to the following formula:

$$F = \frac{K * \sqrt{\frac{U * I}{R}}}{r} \quad [1]$$

where F is the force, K the motor constant, U the determined voltage in the connecting electrical circuit, I the determined current in the connecting electrical circuit, R the resistance of the electric motor, and r the radius of the pinion gear.

In an advantageous embodiment variant the force is determined in a moving state of the component by the voltage determined in the connecting electrical circuit, by the current determined in the connecting electrical circuit, and by a velocity of the component. In this way it is possible in the moving state of the component, i.e. for example when the car door is moving, to determine the force that is transmitted by the pinion gear onto the component and if the car door makes contact with persons or objects acts on the latter by way of the car door.

As well as the determined current and voltage it is additionally necessary in this embodiment variant of the method to determine also the velocity of the component, i.e. of the car door for example. This can be accomplished by way of a corresponding sensor, an incremental encoder for example.

The force can be determined according to the following formula:

$$F = \frac{U * I}{v} \quad [2]$$

where F is the force, U the determined voltage in the connecting electrical circuit, I the determined current in the connecting electrical circuit, and v the velocity of the component.

In addition to the voltage and current, the velocity of the component is beneficially also determined as an average value over a predefined time interval. Such a time interval is for example ten milliseconds. Since all the variables to be determined are determined as average values over the predefined time interval, false alarms due to incorrectly determined forces, due for example to a transient force peak, and for example an erroneous shutdown of the electric motor resulting therefrom, are avoided.

In the case of an elevator false alarms of said type would potentially result in a long downtime of the elevator and a high maintenance overhead with correspondingly high maintenance costs. The predefined time interval should be specified as sufficiently short according to the respective application. In the case of the car door the time interval should be specified for example as short enough to ensure that anyone trapped by the door will not be injured and trapped objects will not be damaged. This is provided with a predefined time interval of for example ten milliseconds, because the effect of such a short-lived force would be barely perceptible.

In another advantageous embodiment variant the force is determined in a moving state of the component by the voltage determined in the connecting electrical circuit, by the current determined in the connecting electrical circuit, by an angular velocity of the motor shaft, and by a radius of the pinion gear. In this way too it is possible in the moving state of the component, i.e. for example when the car door is moving, to determine the force that is transmitted by the pinion gear onto the component and if the car door comes into contact with persons or objects acts on the latter by way of the car door.

As well as the determined current and voltage it is additionally necessary in this embodiment variant of the method to determine also the angular velocity of the motor shaft of an electric motor or of an output shaft when e.g. the motor is a geared motor. This can be accomplished by way of a corresponding sensor, an incremental encoder for example. Furthermore the radius of the pinion gear used in each case must be known. This can likewise be taken for example from a corresponding datasheet or can be measured.

The force can be determined according to the following formula:

$$F = \frac{U * I}{\omega * r} \quad [3]$$

where F is the force, U the determined voltage in the connecting electrical circuit, I the determined current in the connecting electrical circuit, ω the angular velocity of the motor shaft or output shaft, and r the radius of the pinion gear.

In addition to the voltage and current the angular velocity of the motor shaft is also beneficially determined as an average value over a predefined time interval. Such a time interval is for example ten milliseconds. Since all the variables to be determined are determined as average values over the predefined time interval, false alarms due to incorrectly determined forces, due for example to a transient force peak, and for example an erroneous shutdown of the electric motor resulting therefrom, are avoided.

In the case of an elevator false alarms of said type would potentially result in a long downtime of the elevator and a high maintenance overhead with correspondingly high maintenance costs. The predefined time interval should be specified as sufficiently short according to the respective application. In the case of the car door the time interval should be specified for example as short enough to ensure that anyone trapped by the door will not be injured and trapped objects will not be damaged. This is provided with a predefined time interval of for example ten milliseconds, because the effect of such a short-lived force would be barely perceptible.

The inventors propose an apparatus for performing the method for determining a force which acts by way of a pinion gear that is mounted to a motor shaft or on an output shaft of an electric motor onto a component that is directly coupled to the pinion gear in a form-fit and/or force-fit manner, The electric motor is electrically coupled to a power amplifier which is coupled by way of a connecting electrical circuit to an electricity supply unit. The apparatus has an evaluation unit and at least one first sensor that is coupled to the evaluation unit and arranged in the connecting electrical circuit for the purpose of determining a voltage and a current in the connecting electrical circuit.

As already mentioned in the explanatory remarks in relation to the method, the component is for example a door of an elevator car and has for example a gear rack by way of which the car door is directly coupled in a form-fit manner to the pinion gear of the electric motor embodied for example as a gearwheel. Alternatively the pinion gear can be embodied for example as a friction gear and be directly coupled in a force-fit manner to the component embodied for example as a car door.

In another possible alternative the car door can also be coupled to the pinion gear of the electric motor by way of a toothed drive belt for example, in which case the toothed drive belt is then already the component onto which the force to be determined is transmitted by the pinion gear of the electric motor. However, given a transmission ratio of 1:1 in the coupling between the pinion gear and the car door, i.e. between the pinion gear and possible further gears present in the coupling, if friction losses are ignored the force acting on the car door is identical to the force transmitted by the pinion gear onto the toothed drive belt.

The force applied in order to move car doors of said type must not exceed a predefined maximum so that if, for example, persons or objects become trapped any injury to the persons or damage to the objects is prevented. If a malfunction occurs, i.e. the car door fails to open or close fully due to its being blocked for example by persons or objects that have become trapped, or due to a force being exceeded during the movement of the car door, the electric motor must be switched off.

By the apparatus it is possible to determine in a simple and cost-effective manner the force that is transmitted onto the car door by the electric motor and that acts on persons or objects if the car door comes into contact with them. The voltage and current are determined in the connecting electrical circuit by way of which the electricity supply unit, for example a power supply, is coupled to the power amplifier, also called an output stage or motor end stage, i.e. in an intermediate electrical circuit. No intervention in the power amplifier or the electric motor or in the electrical coupling of the power amplifier to the electric motor is therefore necessary in order to determine the voltage and current. This permits the use of a multiplicity of different power amplifiers and electric motors. Furthermore the voltage and current can be determined at affordable cost by corresponding first sensors, since the measurement can be performed on a potential-related basis.

The apparatus beneficially comprises at least one second sensor coupled to the evaluation unit for the purpose of determining a velocity of the component and/or an angular velocity of the motor shaft or output shaft. This enables the method to be performed also when the car door is moving, in particular in its above-described second and third embodiment variants. The second sensor is for example an incremental encoder.

In an use of the method and/or apparatus a malfunction is detected if the determined force exceeds a predefined value. The value is beneficially specified by the maximum force.

In another use of the method and/or apparatus the force is determined in a predefined number of determining cycles and a malfunction is detected if the determined force exceeds a predefined value in a predefined percentage of the determining cycles. Here, too, the value is beneficially specified by the maximum force. The force is determined for example in three determining cycles, so that there are three determined values present for the force. For example, a malfunction will be detected whenever at least two of the three values determined for the force exceed the predefined value, for example the predefined maximum force.

In this way false alarms, i.e. incorrect detections of a malfunction due to brief excesses of force that are insignificant in real-world use, or for example due to measurement errors and for example an erroneous shutdown of the electric motor resulting therefrom, are avoided. In the case of an elevator false alarms of said type would potentially result in a long downtime of the elevator and a high maintenance overhead with correspondingly high maintenance costs.

If a malfunction is detected, the electric motor will beneficially be switched off. This means that when a malfunction is detected the component, for example the door of the elevator car, will no longer be moved, thereby avoiding endangering persons or objects that could be struck by the component, i.e. by the car door, with an excessively high force and trapped, and as a result could be injured or damaged.

In the case of an elevator the entire elevator is beneficially taken out of service as a result thereof in order to avoid endangering persons due to a movement of the elevator car with the car door not closed and furthermore due to unclosed elevator shaft doors which usually are moved by a coupling with the car door. In addition a fault message is preferably generated and forwarded for example to a maintenance service in order to allow a prompt repair. Moreover as a result of such a fault message any persons still present in the elevator car can be freed without delay by the maintenance service.

BRIEF DESCRIPTION OF THE DRAWINGS

These and other objects and advantages of the present invention will become more apparent and more readily appreciated from the following description of the preferred embodiments, taken in conjunction with the accompanying drawing of which:

FIG. 1 shows a schematic view of an elevator car having a car door coupled to an electric motor.

DETAILED DESCRIPTION OF THE PREFERRED EMBODIMENT

Reference will now be made in detail to the preferred embodiments of the present invention, examples of which are illustrated in the accompanying drawing, wherein like reference numerals refer to like elements throughout.

FIG. 1 shows a schematic view of an elevator car 1 which is arranged in an elevator shaft that is not shown here. The elevator car 1 has a car door as a component 2 which is movable during normal operation.

The component 2 is movable by an electric motor 3 which is embodied for example as a direct-current motor. A pinion gear 5, which in this exemplary embodiment is implemented as a gearwheel, is mounted to a motor shaft 4 of the electric motor 3. If the motor is a geared motor (combination of electric motor and gearbox), the pinion gear is mounted to an output shaft (not shown).

Said pinion gear 5 is directly coupled in a form-fit manner to the component 2, i.e. to the car door in the example illustrated here, since a gear rack 6 is embodied on the component 2, with teeth of the pinion gear 5 engaging in interstices between the teeth of the gear rack 6 and teeth of the gear rack 6 engaging in interstices between the teeth of the pinion gear 5, i.e. the gear rack 6 of the component 2 and the pinion gear 5 are interlocked with one another. In an alternative exemplary embodiment not shown here the pinion gear 5 can be embodied for example as a friction gear and engage in a force-fit coupling with the component 2.

The electric motor 3 is electrically coupled to a power amplifier 7 embodied as an output stage, in particular as a motor end stage, which is coupled by way of a connecting electrical circuit 8 to an electricity supply unit 9 embodied as a power supply. The power supply is connected for example to an electricity supply grid of the building.

The force required to move car doors of said type must not exceed a predefined maximum value in order for example to avoid injury to persons or damage to objects in the event that said persons or objects become trapped. If a malfunction is detected, i.e. the car door does not open or close fully due to its being blocked for example by trapped persons or objects, the electric motor 3 must be switched off.

The electric motor 3 must furthermore be switched off if a determined force F acting by way of the pinion gear 5 mounted to the motor shaft 4 on the component 2, i.e. on the car door by way of its embodied gear rack 6, exceeds a predefined value, i.e. the predefined maximum force, since in the event of contact with the car door or persons or objects being trapped by the car door this could lead to injuries to said persons or damage to said objects. In FIG. 1, the force F is shown directed toward the left by way of example. This applies to the case where the pinion gear 5, in a plan view from the front, i.e. in the view shown here, rotates in the clockwise direction. This causes the car door to be moved to the left, for example, in order to open the elevator car 1. Correspondingly, the force F is directed toward the right when the pinion gear 5 rotates in the opposite direction, i.e. in the counterclockwise direction. This causes the car door to be moved to the right, for example, in order to close the elevator car 1 again.

In a method the force F is determined by a voltage U and a current I which are determined in the connecting electrical circuit 8. In order to determine the voltage U and the current I in the connecting electrical circuit 8 an apparatus for performing the method has at least one first sensor 10 arranged in the connecting electrical circuit 8 for the purpose of determining the voltage U and the current I in the connecting electrical circuit 8. Said first sensor 10 is coupled to an evaluation unit 11 in order to evaluate captured sensor data of the first sensor 10 and determine the force F.

The force F can be determined in a moving state of the component 2 by applying the law of energy conservation in relation to an energy in the connecting electrical circuit 8 and a mechanically output energy at the electric motor 3. In this way a direct or indirect measurement of a motor voltage or motor current $I_m$ is avoided and replaced by the much easier and cheaper to implement determination of the voltage U and the current I in the connecting electrical circuit 8.

In a moving state of the component 2 it is additionally necessary also to determine an angular velocity ω of the motor shaft 4 or alternatively to determine a velocity v of the component 2. For this purpose the apparatus has at least one second sensor, not shown in more detail here, which is coupled to the evaluation unit 11 for the purpose of determining the velocity v of the component 2 and/or the angular velocity ω of the motor shaft 4. The second sensor is an incremental encoder for example.

Furthermore, if the force F is determined by the angular velocity ω of the motor shaft 4, a radius r of the pinion gear 5 used in each case must also be known in addition. Said radius r of the pinion gear 5 can be taken for example from a datasheet of the electric motor 3 or pinion gear 5 or can be measured.

For a component 2 moved by the electric motor 3, if friction losses and an efficiency of the electric motor 3 which is less than one hundred percent are ignored, it holds that a product of the voltage U and the current I in the connecting electrical circuit 8 is equal to a product of a torque M at the motor shaft 4 and the angular velocity ω of the motor shaft 4:

$$U*I=M*\omega \qquad [4]$$

The left side of equation [4] describes an electrical power in the connecting electrical circuit 8 and the right side of equation [4] describes a mechanical power of the electric motor 3.

The voltage U and the current I in the connecting electrical circuit 8 are determined directly by the first sensor 10 arranged in the connecting electrical circuit 8. Either the angular velocity ω is determined directly by the second sensor, embodied for example as an incremental encoder, or the velocity v of the component 2 is determined by the second sensor, as a result of which the angular velocity ω can be determined as follows:

$$\omega = 2*\pi*\frac{v}{2*\pi*r} = \frac{v}{r} \qquad [5]$$

where π is the circle constant.

By inverting equation [4] the torque M at the motor shaft 4 can be determined from the voltage U and the current I in the connecting electrical circuit 8 and the angular velocity ω of the motor shaft 4:

$$M = \frac{U*I}{\omega} \qquad [6]$$

Inserting equation [5] for the angular velocity ω of the motor shaft 4 into equation [6] yields the following for the torque M at the motor shaft 4:

$$M = U*I*\frac{r}{v} \qquad [7]$$

The force F corresponds to a quotient of the torque M at the motor shaft 4 and an effective lever arm, a length of the lever arm corresponding to the radius r of the pinion gear 5:

$$F = \frac{M}{r} \qquad [8]$$

Using the velocity v of the component 2, the force F can now be determined by the aforementioned equation [2], which is formed by inserting equation [7] for the torque M at the motor shaft 4 into equation [8]:

$$F = \frac{U * I}{v} \quad [2]$$

Alternatively the force F can be determined using the angular velocity ω of the motor shaft 4 by the aforementioned equation [3], which is formed by inserting equation [6] for the torque M at the motor shaft 4 into equation [8]:

$$F = \frac{U * I}{\omega * r} \quad [3]$$

As mentioned already, friction losses and the efficiency of the electric motor 3 are ignored in said determination of the force F. A real force is therefore always less than the determined force F, because there is always a minimum of friction present and the efficiency of the electric motor 3 is less than one hundred percent.

However, this is very advantageous in particular for this exemplary embodiment of the car door, since in this way there is always a safety margin, so that exceeding the predefined permitted maximum force is prevented. In other words, even if the determined force F corresponds to the predefined maximum force that must not be exceeded, in reality the real force which would act by way of the pinion gear 5 on the component 2, in this case on the car door, and which would possibly act on persons or objects by a front edge of the car door, is less than the predefined maximum force, so there is no fear of injury to persons or damage to objects.

Comparable relationships are also applicable to an immobile state of the component 2. Since in this case the angular velocity ω is equal to zero, the law of energy conservation is applied in this case with a resistance R of the electric motor 3, also called winding resistance or internal resistance, and with the motor current $I_m$ of the electric motor 3, where the motor current $I_m$, as will be shown hereinbelow, can be replaced by the current I and the voltage U in the connecting electrical circuit 8 and the resistance R of the electric motor 3, with the result that there is no need to measure the motor current $I_m$ itself.

In other words, the force F is determined in the immobile state of the component 2 by applying the law of energy conservation in relation to the energy in the connecting electrical circuit 8 and thermal losses in the stationary electric motor 3. In this way, even in the immobile state of the component 2, the direct or indirect measurement of the motor voltage or of the motor current $I_m$ is avoided and replaced by the much easier and cheaper to implement determination of the voltage U and the current I in the connecting electrical circuit 8.

The product of the voltage U and the current I in the connecting electrical circuit 8 is equal to a product of the resistance R of the electric motor 3 and the square of the motor current $I_m$:

$$U*I = R*I_m^2 \quad [9]$$

The left side of equation [9] describes the electrical power in the connecting electrical circuit 8 and the right side of equation [9] describes the thermal losses in the stationary electric motor 3.

In this case too, the voltage U and the current I in the connecting electrical circuit 8 are determined directly by the first sensor 10 arranged in the connecting electrical circuit 8. The resistance R of the electric motor 3 must be known and can be found for example in the datasheet of the electric motor 3.

Following inversion of equation [9] the motor current $I_m$ is yielded as:

$$I_m = \sqrt{\frac{U*I}{R}} \quad [10]$$

Given knowledge of a motor constant K, which can likewise be found for example in the datasheet of the electric motor 3, the force F can be determined using the following formula:

$$F = \frac{K * I_m}{r} \quad [11]$$

Here too, the radius r of the pinion gear 5 used in each case must be known in addition. Said radius r of the pinion gear 5 can, as already mentioned, be found for example in the datasheet of the electric motor 3 or of the pinion gear 5, or it can be measured.

In other words, the force F in the immobile state of the component 2 can be determined by the aforementioned equation [1], which is formed by inserting equation [10] for the motor current $I_m$ into equation [11]:

$$F = \frac{K * \sqrt{\frac{U*I}{R}}}{r} \quad [1]$$

By the method it is possible to determine in a simple and cost-effective manner the force F which is transmitted onto the car door by the electric motor 3 when the car door is stationary, for example when the car door is blocked, or when the car door is moving, and thereby acts for example on persons or objects if the latter were to be struck by a front edge of the car door and/or if the persons or objects become trapped by the car door.

Because the voltage U and the current I are determined in the connecting electrical circuit 8 by way of which the electricity supply unit 9, in this case the power supply, is coupled to the power amplifier 7, in particular to the output stage, also called the motor end stage, i.e. in an intermediate electrical circuit, no intervention into the power amplifier 7 or the electric motor 3 or into the electrical coupling of the power amplifier 7 to the electric motor 3 is necessary in order to determine the voltage and current. Furthermore, the voltage U and the current I can be determined at low cost by corresponding first sensors 10, since measurements can be performed on a potential-related basis. This enables a multiplicity of different power amplifiers 7 and electric motors 3 to be used, with the method being able to be performed without problem in each case.

As already mentioned, friction losses and the efficiency of the electric motor 3 are ignored when the force F is determined in this way. A real force is therefore always less than the determined force F, since there is always a minimum of friction present and the efficiency of the electric motor 3 is less than one hundred percent.

However, this is very advantageous in particular for this exemplary embodiment of the car door, as already explained hereinabove, because in this way a safety margin is always provided, thereby preventing the predefined permitted maximum force from being exceeded. In other words, even if the determined force F corresponds to the predefined maximum force which must not be exceeded, in reality the real force acting by way of the pinion gear 5 on the component 2, in this case on the car door, and which would possibly act on persons or objects by the front edge of the car door, is less than the predefined maximum force, so there is no fear of injury to persons or damage to objects.

Beneficially, the voltage U and the current I in the connecting electrical circuit 8, and advantageously in addition, if these are used, also the velocity v of the component 2 and/or the angular velocity ω of the motor shaft 4, are determined as average values over a predefined time interval. Such a time interval is for example ten milliseconds.

This is useful on account of energy being stored in the arrangement formed by the electricity supply unit 9, the power amplifier 7, the electric motor 3 and the component 2 coupled thereto. This enables transient force peaks that are not detectable during the energy input to be caused or compensated. Determining the voltage U and the current I, and advantageously in addition, if these are used, also the velocity v of the component 2 and/or the angular velocity ω of the motor shaft 4, as average values over the predefined time interval avoids false alarms due to incorrectly determined forces, for example due to a transient force peak, and for example an erroneous shutdown of the electric motor 3 resulting therefrom. In the case of an elevator, false alarms of said type would potentially result in a long downtime of the elevator and a high maintenance overhead with correspondingly high maintenance costs.

The predefined time interval should be specified as sufficiently short according to the respective application. In the case of the car door the time interval should be specified for example as short enough to ensure that anyone trapped by the door will not be injured and trapped objects will not be damaged. This is provided with a predefined time interval of for example ten milliseconds, because the effect of such a short-lived force would be barely perceptible.

The method and the apparatus for determining the force F can be used for example for detecting a malfunction. In this case a malfunction is detected for example if the determined force F exceeds a predefined value. The value is beneficially specified by the maximum force.

It is particularly advantageous in this case if the force F is determined in a predefined number of determining cycles and a malfunction is detected if the determined force F exceeds the predefined value in a predefined percentage of the determining cycles. Here too, the value is beneficially specified by the maximum force.

The force F is determined for example in three determining cycles, so that there are three determined values present for the force F. For example, a malfunction will be detected whenever at least two of the three values determined for the force F exceed the predefined value, for example the predefined maximum force.

In this way false alarms, i.e. incorrect detections of a malfunction due to brief excesses of force that are insignificant in real-world use, or for example due to measurement errors and for example an erroneous shutdown of the electric motor resulting therefrom, are avoided. In the case of an elevator false alarms of said type would potentially result in a long downtime of the elevator and a high maintenance overhead with correspondingly high maintenance costs.

If a malfunction is detected, the electric motor 3 is beneficially switched off. For this purpose the apparatus, for example the evaluation unit 11 of the apparatus, is advantageously coupled to the electric motor 3 in order to enable the latter to be switched off if a malfunction is detected.

As a result of the electric motor 3 being switched off when such a malfunction is detected, the component 2, for example the door of the elevator car 1, will no longer be moved, thereby avoiding endangering persons or objects that could be struck by the component 2, i.e. by the car door, with an excessively high force and trapped, and as a result could be injured or damaged.

In the case of an elevator the entire elevator is beneficially taken out of service as a result thereof in order to avoid endangering persons due to a movement of the elevator car 1 with the car door not closed and furthermore due to unclosed elevator shaft doors which usually are moved by a coupling with the car door. In addition a fault message is preferably generated and forwarded for example to a maintenance service in order to allow a prompt repair. Moreover, as a result of such a fault message any persons still present in the elevator car 1 can be freed without delay by the maintenance service.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV,* 69 USPQ2d 1865 (Fed. Cir. 2004).

The invention claimed is:

1. A method for determining a force which acts on a component by way of a pinion gear which is connected to a shaft rotated by an electric motor, the component being directly coupled to the pinion gear, comprising:

determining a voltage and a current supplied from a power supply device to the electric motor via a power amplifier, the voltage and the current being determined by way of a connecting electrical circuit, which connects the power amplifier to the power supply device; and when the component is moving with a velocity, determining the force acting on the component, using the voltage, the current, and either:

an angular velocity of the shaft and a radius of the pinion gear, or an average value of the velocity of the component determined over a predefined time interval.

2. The method as claimed in claim 1, wherein the shaft is a motor shaft of an electric motor.

3. The method as claimed in claim 1, wherein the shaft is a motor shaft of an electric motor, and the force is determined using the angular velocity of the motor shaft.

4. The method as claimed in claim 1, wherein the shaft is an output shaft of a geared motor.

5. The method as claimed in claim 1, wherein the shaft is an output shaft of a geared motor, and the force is determined using the angular velocity of the output shaft.

6. The method as claimed in claim 1, wherein the component is directly coupled to the pinion gear in a form-fit manner.

7. The method as claimed in claim 1, wherein the component is directly coupled to the pinion gear in a force-fit manner.

8. The method as claimed in claim 1, wherein the voltage and the current in the connecting electrical circuit are determined as average values over the predefined time interval.

9. The method as claimed in claim 1, wherein
when the component is in an immobile state, the force is determined using the voltage, the current, a motor constant of the electric motor, a resistance of the electric motor, and a radius of the pinion gear.

10. The method as claimed in claim 1, wherein
if the force is determined when the component is moving using the angular velocity of the shaft, the angular velocity of the shaft is determined as an average value over the predefined time interval.

11. The method as claimed in claim 1, wherein
the force is cyclically determined in determining cycles, and
a malfunction is detected if the force exceeds a set value in a predefined percentage of the determining cycles.

12. The method as claimed in claim 11, wherein
the electric motor is switched off if the malfunction is detected.

13. An apparatus to determine a force which acts on a component by way of a pinion gear which is connected to a shaft rotated by an electric motor, the component being directly coupled to the pinion gear, the apparatus comprising:
a first sensor to determine a voltage and a current supplied from a power supply device to the electric motor, the first sensor being coupled to a connecting electrical circuit, which connects the power amplifier to the power supply device;
a second sensor coupled to the shaft to determine an angular velocity of the shaft; and
an evaluation unit connected to the first sensor and the second sensor, to determine the force acting on the component when the component is moving, the force being determined using the voltage, the current, the angular velocity of the shaft and a radius of the pinion gear.

\* \* \* \* \*